(12) United States Patent
Miao et al.

(10) Patent No.: US 8,798,653 B2
(45) Date of Patent: Aug. 5, 2014

(54) PROBABILISTIC INTERFERENCE MITIGATION FOR WIRELESS CELLULAR NETWORKS

(75) Inventors: Guowang Miao, Atlanta, GA (US); Nageen Himayat, Freemont, CA (US); Shilpa Talwar, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 13/224,148

(22) Filed: Sep. 1, 2011

(65) Prior Publication Data

US 2012/0058789 A1    Mar. 8, 2012

Related U.S. Application Data

(63) Continuation of application No. 11/965,788, filed on Dec. 28, 2007, now abandoned.

(51) Int. Cl.
*H04B 1/00*    (2006.01)
*H04B 17/00*    (2006.01)
*H04B 7/00*    (2006.01)

(52) U.S. Cl.
USPC .......... 455/501; 455/522; 455/69; 455/67.13; 455/63.1; 455/226.1

(58) Field of Classification Search
CPC .................................................. H04W 52/34
USPC .................... 455/522, 69, 67.11, 67.13, 63.1
See application file for complete search history.

(56) References Cited

U.S. PATENT DOCUMENTS

| | | | |
|---|---|---|---|
| 6,603,753 B1* | 8/2003 | Bedekar et al. | 370/335 |
| 7,778,657 B2* | 8/2010 | Lin et al. | 455/522 |
| 8,023,955 B2* | 9/2011 | Anderson | 455/450 |
| 8,315,569 B2* | 11/2012 | Harada et al. | 455/62 |
| 8,412,243 B2* | 4/2013 | Park et al. | 455/501 |
| 8,458,345 B2* | 6/2013 | Stamoulis et al. | 709/229 |
| 8,594,028 B2* | 11/2013 | Mark | 370/329 |
| 2005/0152329 A1* | 7/2005 | Krishnan et al. | 370/345 |
| 2006/0217062 A1 | 9/2006 | Saffre et al. | |
| 2007/0238480 A1 | 10/2007 | Lin | |
| 2009/0170497 A1* | 7/2009 | Miao et al. | 455/422.1 |
| 2009/0228598 A1* | 9/2009 | Stamoulis et al. | 709/230 |
| 2009/0270043 A1 | 10/2009 | Miyoshi et al. | |
| 2010/0041408 A1* | 2/2010 | Caire et al. | 455/446 |
| 2010/0105406 A1* | 4/2010 | Luo et al. | 455/452.2 |
| 2010/0142458 A1* | 6/2010 | Mark | 370/329 |
| 2010/0144381 A1* | 6/2010 | Park et al. | 455/501 |
| 2010/0233963 A1* | 9/2010 | Harada et al. | 455/63.3 |
| 2012/0058789 A1* | 3/2012 | Miao et al. | 455/501 |

OTHER PUBLICATIONS

R. Prakash, N. Shivaratri, and M. Singhal, "Distributed dynamic fault-tolerant channel allocation for mobile computing," IEEE Transactions on Vehicular Technology, 48(6): pp. 1874-1888, Nov. 1999.

(Continued)

*Primary Examiner* — Tilahun B Gesesse
(74) *Attorney, Agent, or Firm* — Carrie A. Boone, P.C.

(57) ABSTRACT

An interference mitigation system randomizes transmissions to cell-edge users by carefully controlling the probability of transmission to these users, thereby creating a virtual fractional frequency system that does not require extensive frequency management and coordination across the network. In some embodiments, the interference mitigation system identifies severely interfered links and reduces the probability of transmission on these links, with the result being a reduced probability of interference.

10 Claims, 9 Drawing Sheets

(56) References Cited

OTHER PUBLICATIONS

G. Cao, M. Singhal, "An adaptive distributed channel allocation strategy for mobile cellular networks," J. Parallel and Distributed Computing, 60(4), pp. 36-42, 2000.

J.G. Andrews, "Interference cancellation for cellular systems: a contemporary overview," Wireless Communications, IEEE, vol. 12, Issue 2, Apr. 2005, pp. 19-29.

J. Li, K. B. Letaief, Z. Cao, "Co-channel interference cancellation for space-time coded OFDM systems," IEEE Transactions on Wireless Communications, vol. 2, Issue 1, Jan. 2003, pp. 41-49.

H. Dai, A.F. Molisch, H.V. Poor, "Downlink capacity of interference-limited MIMO systems with joint detection," IEEE Transactions on Wireless Communications, vol. 3, Issue 2, Mar. 2004, pp. 442-453.

S. Shamai, B. M. Zaidel, "Enhancing the cellular downlink capacity via co-processing at the transmitting end," Vehicular Technology Conference, Spring, 2001, IEEE VTS 53rd vol. 3, May 6-9, 2001, pp. 1745-1749.

H. Zhang, H. Dai, "Co-channel interference mitigation and cooperative processing in downlink multicell multiuser MIMO networks," EURASIP Journal on Wireless Communications and Networking, 2004:2, pp. 222-235.

W. Choi, J. G. Andrews, "Base station cooperatively scheduled transmission in a cellular MIMO TDMA system," 40th Annual Conference on Information Science and Systems, 2006, Mar. 2006, pp. 105-110.

P.E. Omiyi, H. Haas, G. Auer, "Analysis of intercellular timeslot allocation in self-organising wireless networks," IEEE 17th International Symposium on Personal, Indoor, and Mobile Radio Communications, 2006, vol. 6, Jun. 2004, pp. 1-5.

P. Omiyi, H. Hass, "Improving time-slot allocation in 4th generation OFDM/TDMA TDD radio access networks with innovative channel-sensing," IEEE International Conference on Communications, 2004, vol. 6, pp. 3133-3137.

G. Miao, Y. Li, "Interference avoidance in wireless cellular networks," Intel presentation, Sep. 2007.

\* cited by examiner

PROBABILISTIC INTERFERENCE MITIGATION FOR WIRELESS CELLULAR NETWORKS

CROSS-REFERENCE TO RELATED APPLICATIONS

This application claims priority to U.S. application Ser. No. 11/965,788, filed on Dec. 28, 2007.

TECHNICAL FIELD

This application relates to wireless cellular systems and, more particularly, to mitigation of co-channel interference in a wireless neighborhood.

BACKGROUND

The performance of wireless cellular systems is significantly limited due to co-channel interference from neighboring base stations, especially as these systems move towards aggressive frequency reuse scenarios. While the overall spectral efficiency of the cellular system may improve with aggressive frequency reuse, the performance of cell-edge users degrades substantially. Recent research is focused on a variety of interference management techniques, ranging from the design of fractional frequency reuse (FFR) mechanisms for cell-edge users, to coordinated transmit beam-forming techniques, to receiver interference cancellation using multiple antennas.

One simple approach to reducing interference for the cell edge users is to reserve a set of frequencies used for transmission to only cell-edge users in a fashion such that adjacent cells use different sets of frequencies. This may be achieved through a fractional frequency reuse (FFR) mechanism wherein a lower frequency reuse is specified for users at the cell edge, cell-center users enjoy full frequency reuse. This improves the throughput performance of cell-edge users since they experience lower levels of interference.

FIG. 1 shows an exemplary network deployment 50 with fractional frequency reuse. Such a deployment enables most of the frequencies ('white') to be reused over a significant portion of each cell, and only a fraction of frequencies to be set aside for cell-edges ('dotted', 'vertical striped', 'diagonal striped'). While initial deployments with FFR may use a static sub-division of cell-edge and cell-center frequencies, it is expected that the frequency reuse patterns be dynamically adjustable through coordination across the network, since the traffic load and user distribution may not be uniform across the network.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a system and method for reducing interference in a network, or interference mitigation system and method, are disclosed. The interference mitigation system includes a co-channel interference avoidance (CIA) medium access controller (MAC) in both a base station and a subscriber station of a wireless neighborhood. The interference mitigation method randomizes transmissions to cell-edge users by carefully controlling the probability of transmission to these users, thereby creating a virtual fractional frequency system that does not require extensive frequency management and coordination across the network. In some embodiments, the interference mitigation method identifies severely interfered links and reduces the probability of transmission on these links, with the result being a reduced probability of interference.

Figure 1:
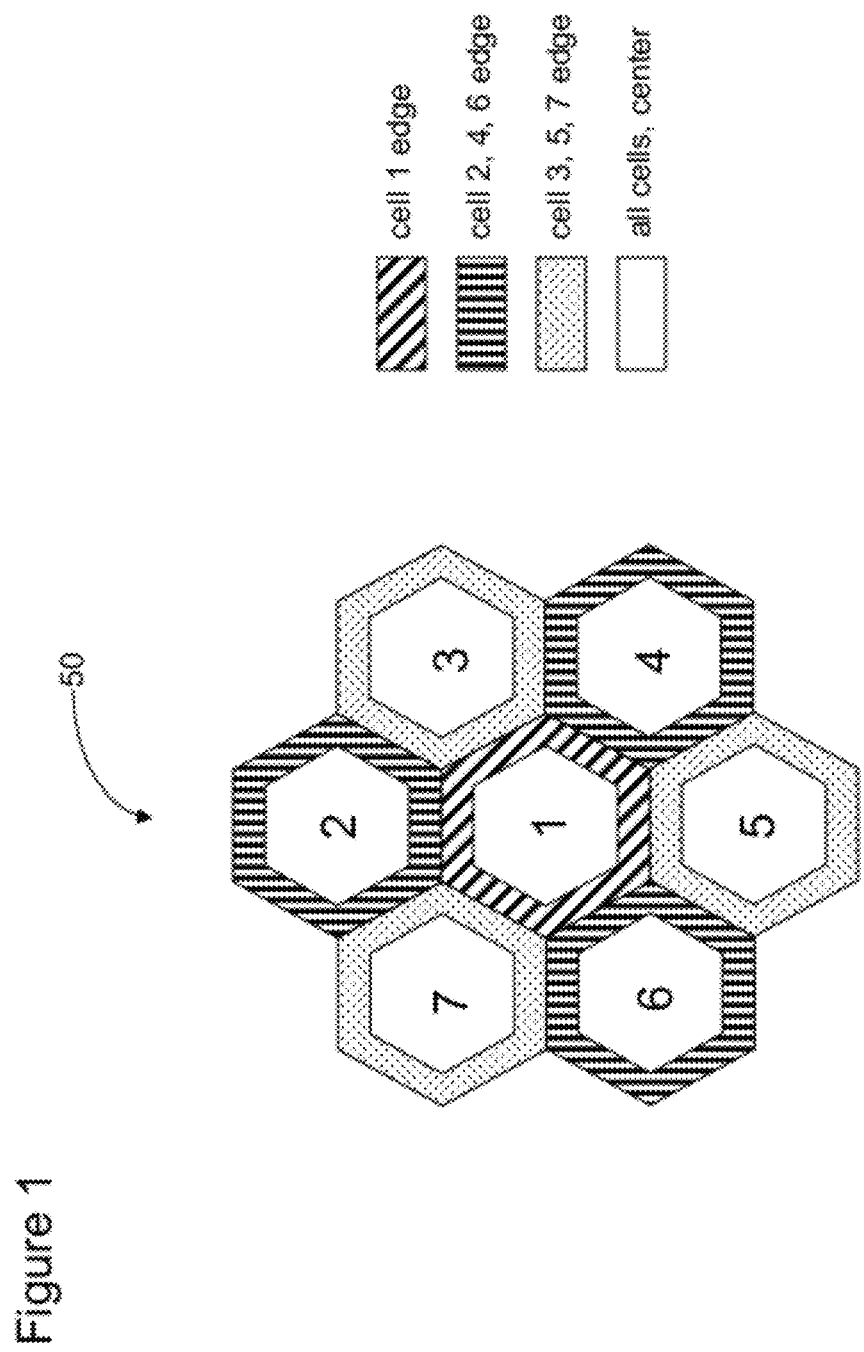
FIG. 1 is an exemplary network deployment with fractional frequency reuse, according to the prior art.
Figure 2:
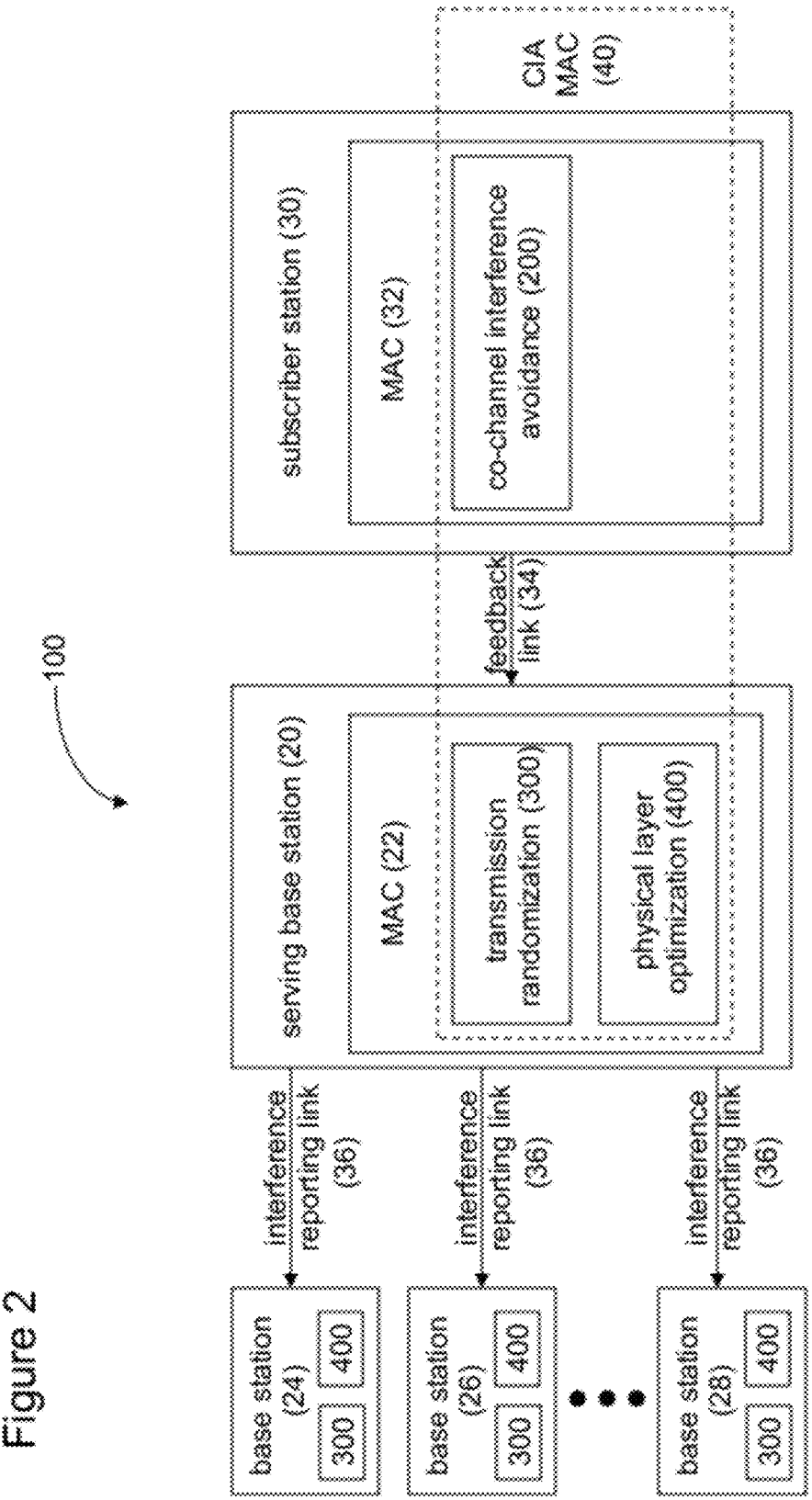
FIG. 2 is a block diagram of a interference mitigation system, according to some embodiments.

An interference mitigation system 100 is depicted in FIG. 2, according to some embodiments. The interference mitigation system 100 includes a serving base station 20 and a subscriber station 30. The serving base station is typically selected by the subscriber 30, based on the relative strength of the base station signal received by the subscriber. The system 100 may include one or more other base stations, denoted as base station 24, base station 26 . . . and base station 28. The serving base station 20 has a medium access controller (MAC) 22 and the subscriber station 30 has a MAC 32. The MACs 22 and 32 include functional and structural components not described herein, which are well-known to those of ordinary skill in the art. These functional and structural components, which are common to all base stations in the wireless region, are known herein as legacy MAC operations.

In some embodiments, the MACs 22 and 32 each include novel components suitable for co-channel interference avoidance (CIA), known as the CIA MAC 40. Because the MACs 22 and 32 continue to support other MAC functions not described herein, both the serving base station 20 and the subscriber station 30 have both legacy MAC and CIA MAC 40 functionality.

The CIA MAC 40 includes co-channel interference avoidance 200, transmission randomization 300, and physical layer optimization 400, in some embodiments. As shown in FIG. 2, co-channel avoidance 200 is performed by the subscriber station 30 while transmission randomization 300 and physical layer optimization 400 are performed by the base stations 20, 24, 26, 28. Co-channel avoidance 200 is described in the flow diagram of FIG. 4; transmission randomization 300 is described in the flow diagram of FIG. 5.

Figure 3:
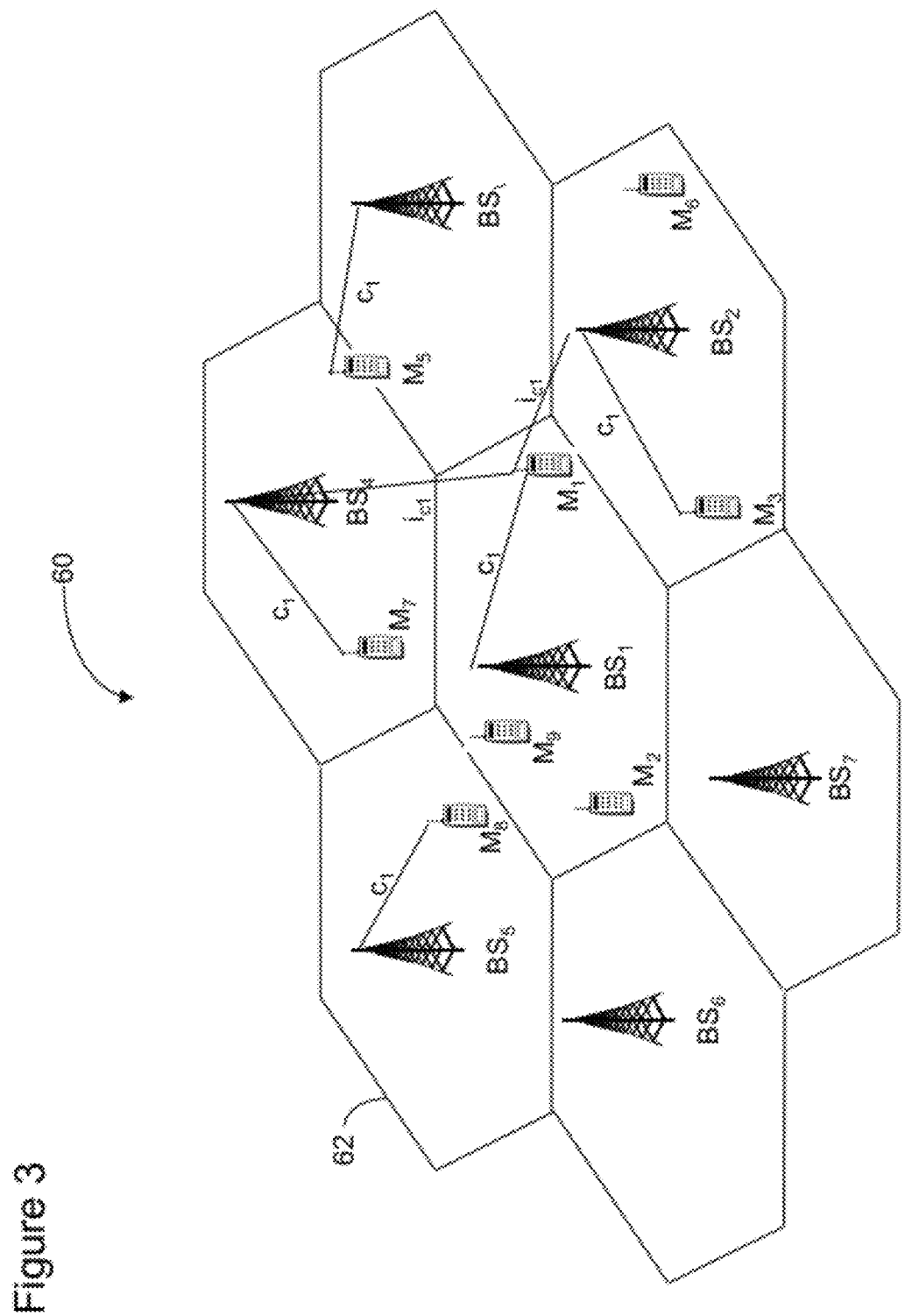
FIG. 3 is a diagram of a wireless neighborhood using the interference mitigation system of FIG. 2, according to some embodiments.

A wireless neighborhood 60 is depicted in FIG. 3, to facilitate understanding of the system 100 of FIG. 2, according to some embodiments. The wireless neighborhood 60 includes seven cells 62, each of which has a base station, $BS_1$-$BS_7$ (collectively, base stations BS). Subscribers, depicted as mobile devices, denoted $M_1$, $M_2$, ... $M_9$, are employed throughout the wireless neighborhood 60 (collectively, subscribers M). The number of subscribers M may vary over time. Lines $c_1$ show the desired links between mobile subscribers and base stations. For mobile subscriber $M_1$, there exists a desired link, $c_1$, to the base station, $BS_1$. Because the base stations are transmitting on channel 1 ($c_1$) using the same frequency, such transmission may cause interference to mobile stations in other cells. For example, in FIG. 3, interferences on the same channel are occurring from base stations, $BS_4$ and $BS_2$, indicated as $i_{c1}$ in both cases.

The interference mitigation system 100 commences with the subscriber station 30. The subscriber station 30 notifies the serving base station 20 of interference from some other base station in the wireless neighborhood 60. In FIG. 2, a feedback link 34 is shown pointing from the subscriber station 30 to the serving base station 20 to indicate this step. Then, the serving base station 20 shares the interference report(s) with the other base stations in the wireless neighborhood 60 that there has been a report of interference. Interference reporting links 36 are shown in FIG. 2 between the serving base station 20 and each of the base stations 24, 26, and 28 in the system 100. Once all base stations in the wireless neighborhood 60 are aware of the interference, the base stations determine whether to perform transmission randomization 300, in some embodiments. Like other transmissions, randomized transmissions occur according to parameters obtained through physical layer optimization 400.

Figure 4:
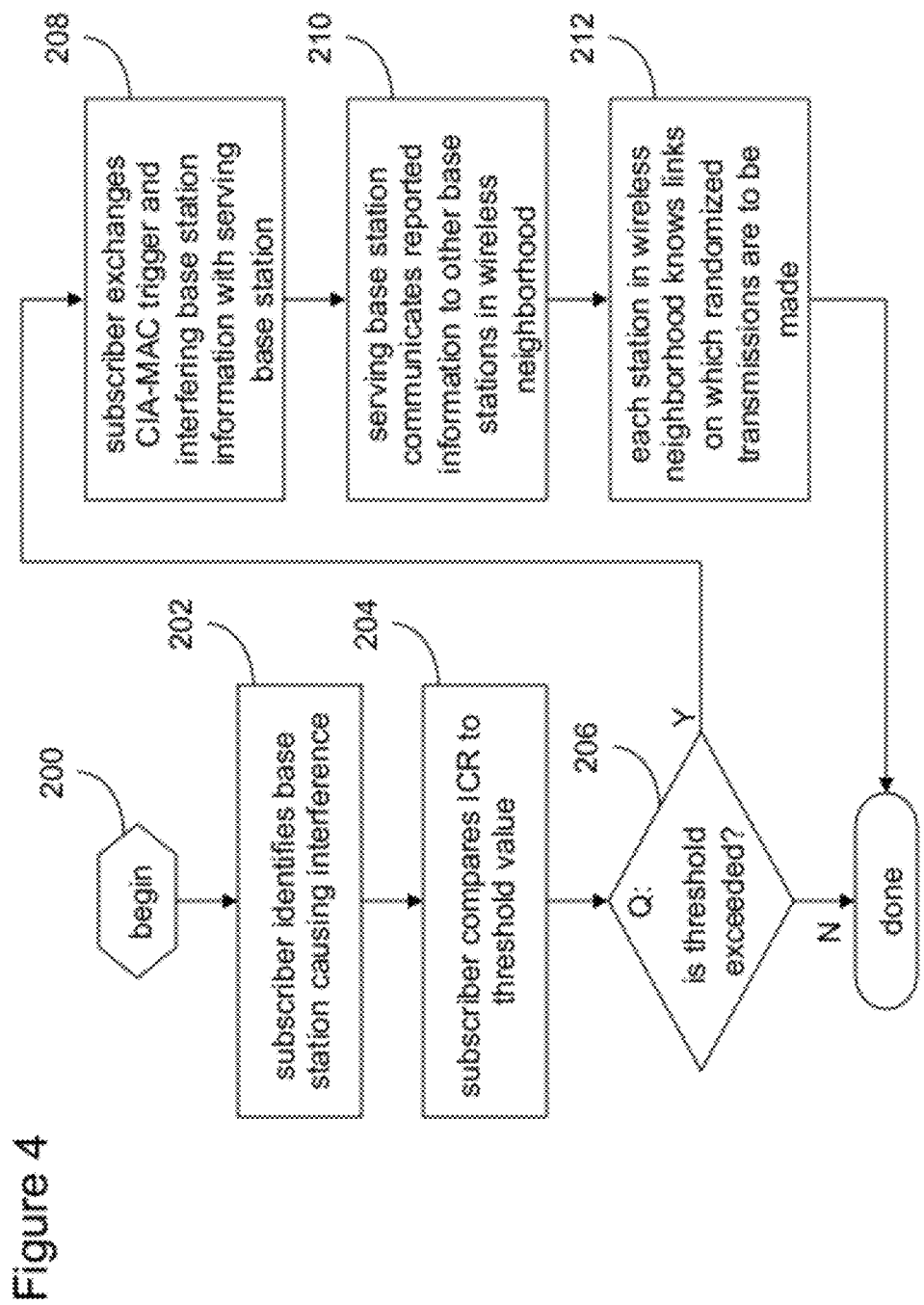
FIG. 4 is a flow diagram showing the co-channel interference avoidance of the interference mitigation system of FIG. 2, according to some embodiments.

Co-channel interference avoidance 200 operates according to the flow diagram of FIG. 4, in some embodiments. The operations are performed by the subscriber 30 (or one of the subscribers M in the wireless neighborhood 60), although the operations may be performed simultaneously by multiple subscribers. The subscriber 30 identifies the base station 20 (or stations) causing the most interference to transmissions on its link to the serving base-station (block 202). The subscriber 30 then makes a determination whether to notify its serving base station 20 of the interference by comparing the interference-to-carrier ratios (ICR) to a threshold ($\Gamma$) (block 204).

If the threshold is not exceeded (block 206), the interference is not sufficient to trigger the notification by the subscriber 30. Otherwise, the subscriber 30 submits the identity of the base-station(s) causing the most interference to its serving base station 20 (block 208). In some embodiments, the submission operation constitutes one or more exchanges of the CIA MAC trigger information between the subscriber station 30 and the serving base station 20. As used herein "CIA MAC trigger" means events that lead the subscriber station 30 or the serving base station 20 to invoke the CIA MAC 40 of their respective MACs 22, 32. In other words, the CIA MAC trigger is when the subscriber station 30 determines that the interference exceeds the threshold.

The serving base station 20 communicates the information reported by the subscriber 30 to other base stations in the wireless neighborhood 60 (block 210). At this point, each base station knows the links in which interference has been reported, which are the links in which transmissions may optimally be randomized (block 212). In some embodiments, the CIA MAC trigger may be based on average SINR conditions, determined by system geometry and location of subscribers. In these embodiments, the CIA MAC trigger is updated and coordinated among other base stations in the wireless neighborhood periodically.

Figure 5:
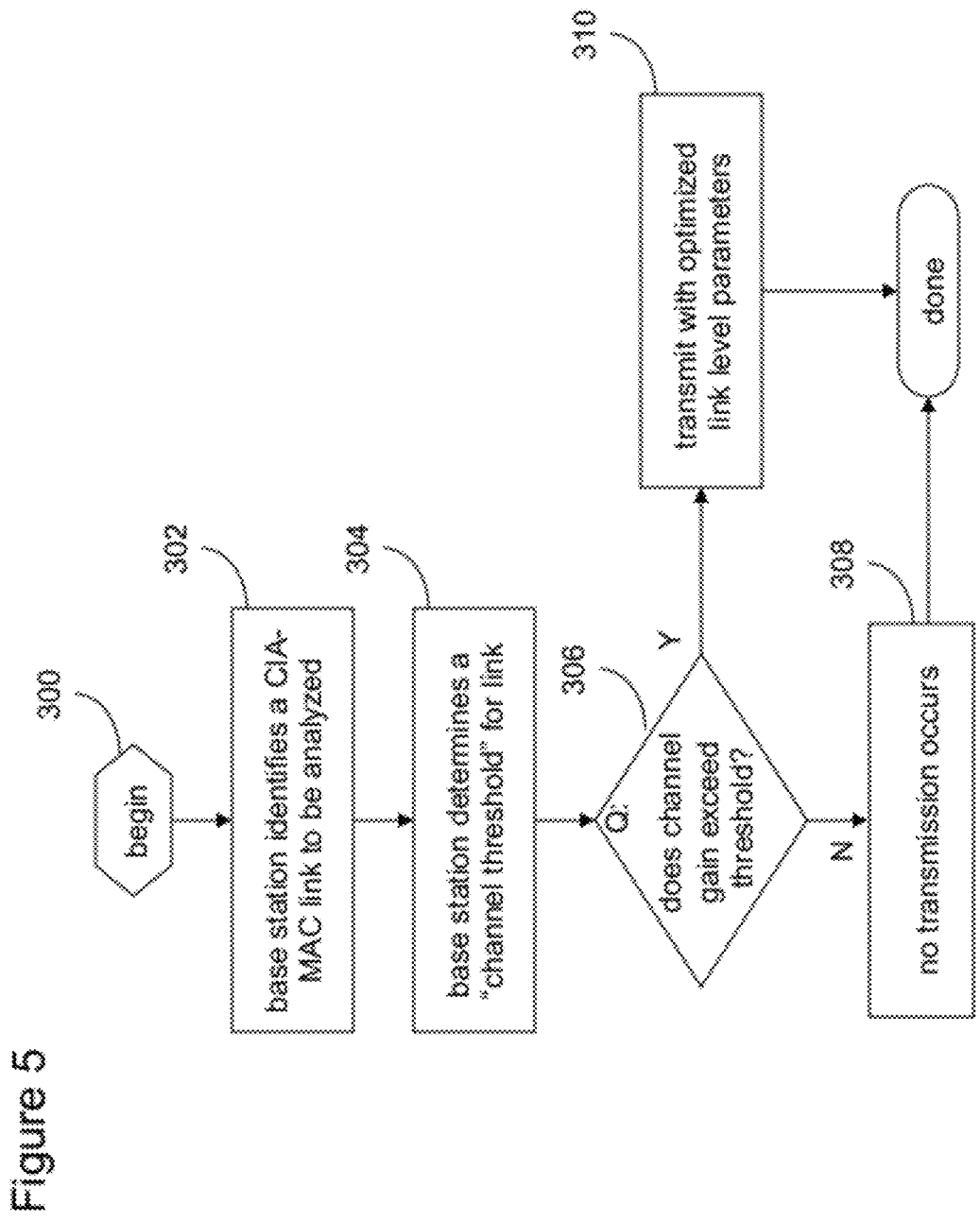
FIG. 5 is a flow diagram the transmission randomization of the interference mitigation system of FIG. 2, according to some embodiments.

Once the CIA MAC 40 is triggered, the transmission randomization 300 of the MAC 22 in the serving base station 20 is initiated. The other base stations in the wireless neighborhood likewise initiate transmission randomization to the subscriber station 30. FIG. 5 is a flow diagram showing operations performed to randomize transmissions in the wireless neighborhood 60, according to some embodiments. The operations in FIG. 5 may be performed by all base stations BS in the wireless neighborhood 60, but, for simplification, only one base station is indicated in the flow diagram.

The base station identifies the link to be analyzed (block 302), which is the link between the serving base station 20 and the subscriber 30 that reported the interference. The base station determines a channel threshold for the CIA MAC link (block 304). If the channel gain on the link does not exceed a "channel threshold", $\overline{H}$ (block 306), no transmission to the subscriber 30 occurs (block 308). Otherwise, the base station 20 transmits to the subscriber 30 with optimized physical layer parameters (block 310). Hence, in some embodiments, the transmission probability is proportional to the probability of exceeding the "channel threshold".

The CIA MAC 40 also includes physical layer optimization 400. In some embodiments, the power and modulation on each link is optimized separately. The components of the CIA MAC 40 shown in FIG. 2 may be realized in different ways.

In some embodiments, once a decision to trigger the CIA MAC 40 on a given link is reached, the system 100 determines the transmission threshold $\overline{H}$, the power allocation, and the modulation selection policy through optimization of the following criterion. This criterion is based on a proportional fair approach of maximizing the product of the goodput of all users. The transmission threshold, power allocation, and modulation parameters may also be derived through alternative optimization criteria.

In some embodiments, the system 100 uses an optimization equation to determine the channel threshold $\overline{H}$ and the optimal link parameters for transmission to the subscriber 30, as follows:

$$C^* = \underset{\{H,P\}}{\text{Argmax}} \prod_{\forall(i,j)_k} \left[ \frac{R(i,j)_k}{S} \left(1 - FER_{(i,j)_k} p(i,j)_k \prod_{l \in N_j} (1 - p_l)\right) \right]$$

subject to $$\int_{\overline{H}(i,j)_k}^{\infty} f(h) P(i,j)_k(h) dh \le \overline{P} \quad \text{(Average power constraint)}$$

$$0 \le P(i,j)_k \le P_{max} \quad \text{(Peak power contraint)}$$

where $(i,j)_k$ is the link between the $i^{th}$ base station and the $j^{th}$ subscriber on the $k^{th}$ channel; $R(i,j)_k$ is the rate on link $(i,j)_k$; $FER(i,j)_k$ is the average frame error rate on link $(i,j)_k$; $p(i,j)_k$ is the probability of transmission on link $(i,j)_k$; $N_j$ is the set of base stations comprising severe interferers for the $j^{th}$ subscriber; $p_l$ is the probability of transmission by the $l^{th}$ interfering base station; $\overline{H}$ is the threshold for transmission; $P(i,j)_k$ is the average transmit power on link $(i,j)_k$; $f(h)$ is the probability distribution of fast fading channel with cumulative distribution function, $F$; and $S$ is the frame length.

An example approach to solving the above optimization problem is to separate the optimization function into two distinct parts. The separation is motivated in part by the fact that maximization of the objective function is equivalent to maximizing the log of the objective function. The two parts separately address the issue of minimizing collisions and maximizing throughput.

Using the logarithm function splits the problem into two parts. The first part is related to the transmission probabilities of the desired and interfering base-stations. The objective, in this case, thus reduces to finding the threshold $\overline{H}$ to minimize the probability of collision in the network. The second part maximizes the sum of the average throughput on all links, which can be solved through a suitable power and rate allocation strategy per link. The objective functions for the two problems are defined in the following sections.

First, the probability of transmission is determined by the system 100 as follows. In some embodiments, the threshold $\overline{H}$ is determined through a solution to the following optimization criterion:

$$\overline{H}^* = \underset{\overline{H}}{\operatorname{argmax}} \sum_{\forall (i,j)_k} \ln\left(p(i,j)_k \prod_{l \in N_j}(1-p_l)\right)$$

It can be shown that the optimal threshold and consequently the probability of transmission on a given link is given by:

$$\overline{H}^*(i,j)_k = F^{-1}\left(\frac{|\Gamma(i,j)_k|}{|\Gamma(i,j)_k|+1}\right) \text{ and } p^*(i,j)_k = \frac{1}{|\Gamma(i,j)_k|+1}$$

In the above, $\Gamma(i,j)_k$ is the number of base stations severely interfering on channel $(i,j)_k$.

Next, the interference mitigation system 100 performs physical layer optimization 400, in some embodiments. This part of the CIA MAC 40 resides in all base stations in the wireless neighborhood 60. The interference mitigation system 100 optimizes the physical layer parameters per link. In some embodiments, the physical power and rate parameters on the link are determined through maximization of the throughput of all users, using the following objective function:

$$P^*(i,j)_k = \arg\max_{\{P(i,j)_k\}} R(i,j)_k$$

subject to $$\int_{\overline{H}(i,j)_k}^{\infty} f(h)P(i,j)_k(h)dh \le \overline{P} \text{ (average power constraint)}$$

$$0 \le P(i,j)_k \le P_{max} \text{ (Peak power constraint)}$$

Each user may vary both the transmitted power and rate to achieve best transmission performance. The signal-to-noise ratio (SNR) is denoted as $\eta$, the data rate function $R'^{-1}(\eta)$ is continuously differentiable with first order derivative positive and strictly decreasing, i.e. concave of $\eta$. The power allocation is given by:

$$\text{if } P_m < \frac{\overline{P}}{1-F(\overline{H}^*_{(i,j)_k})}, P^*_{(i,j)_k}(h) = P_m \text{ for } h \ge \overline{H}^*_{(i,j)_k},$$

otherwise,

-continued $$P^*_{(i,j)_k}(h) = \begin{cases} P_m & v^* < R'\left(\frac{hP_m}{n_o W}\right)\frac{h}{n_o W} \\ 0 & v^* \ge R'\left(\frac{hP_m}{n_o W}\right)\frac{h}{n_o W} \\ R'^{-1}\left(\frac{v^* n_o W}{h}\right)\frac{n_o W}{h} & \text{otherwise,} \end{cases}$$

for $h \ge \overline{H}_{(i,j)_k}^*$. $R'^{-1}()$ is the inverse function of $R'()$. $v^* \ge 0$ is uniquely given by $$\int_{\overline{H}_{(i,j)_k}}^{\infty} P^*_{(i,j)_k}(h)f(h)dh = \overline{P}.$$

Figure 6:
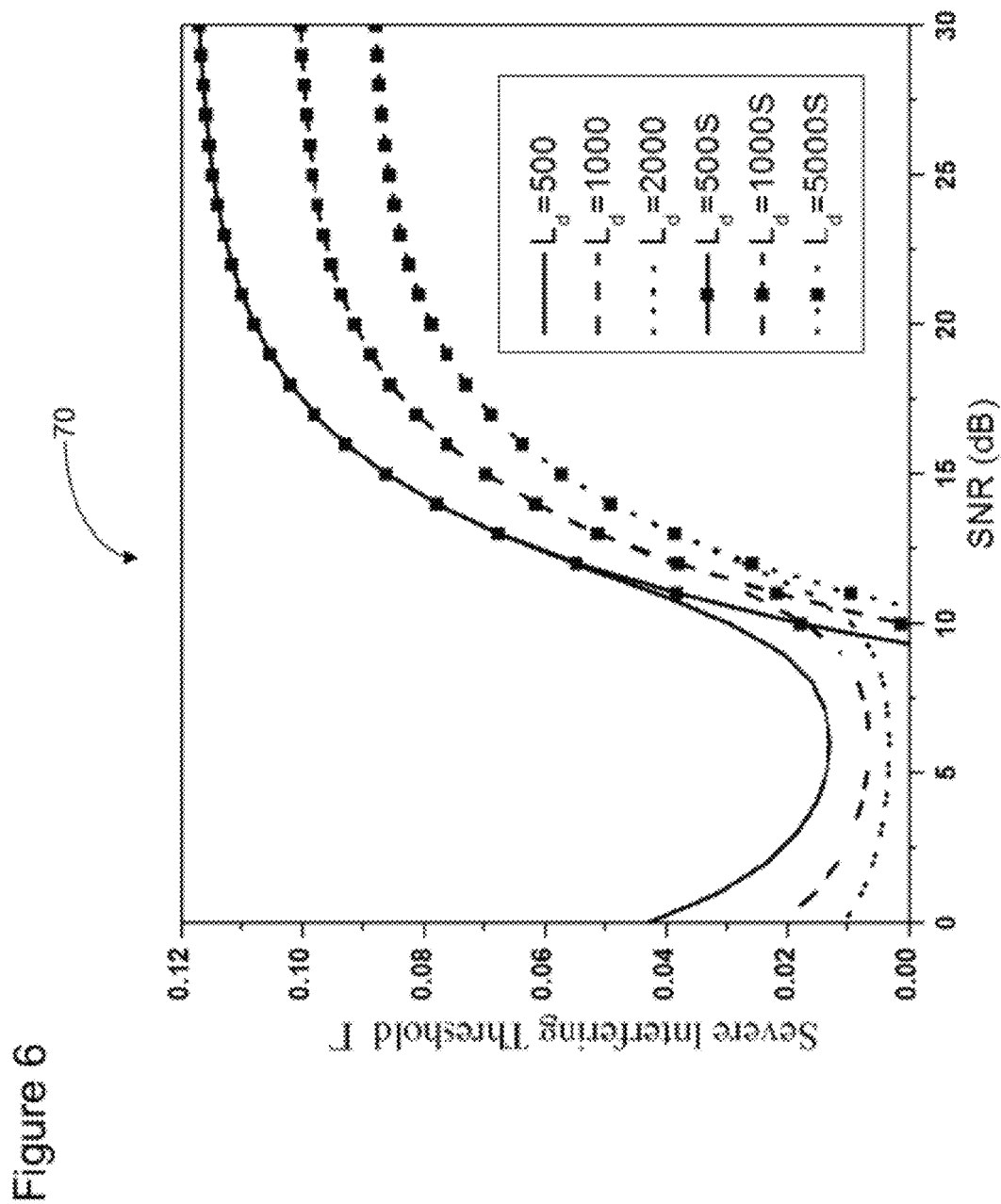
FIG. 6 is a graph of a co-channel interference avoidance trigger threshold, according to some embodiments.

Before the transmission randomization 300 and physical layer optimizations 400 can take place, however, the interference mitigation system 100 determines the threshold for the CIA MAC trigger. In some embodiments, each subscriber 30 makes a decision to trigger the CIA MAC 40. This trigger is based on comparing the measured interference-to-carrier-ratio (ICR) from each base-station to a threshold, as described in FIG. 4, above. In some embodiments the threshold is derived based on the assumption of one strong interferer per subscriber. The extension to multiple interferers is straightforward. In some embodiments, where there is a single interferer, the optimal threshold is derived by comparing the goodput of a system using the CIA MAC with that of a system having no CIA MAC. For the optimal threshold, the goodput of CIA MAC is greater than the goodput of a traditional MAC. The values of the ICR thresholds are calculated as a function of the SNR, as shown in the graph 70 of FIG. 6, according to some embodiments.

The value of the threshold at a high SNR is derived as a function of the target probability of error $P_e$ and the number of data symbols, $L_d$, as $$\Gamma = \frac{1}{P_e\lceil 1-(1/4)^{1/L_d R}\rceil} - \frac{1}{SNR}.$$

The graph 70 plots the values of the thresholds as a function of the SNR for various numbers of data symbols.

The interference mitigation system 100 may employ alternate methods for triggering the CIA MAC. These include but are not limited to comparing goodput based on more than one strong interferer, using location-based information or cooperation between subscribers to determine severely interfered users, etc.

Figure 7:
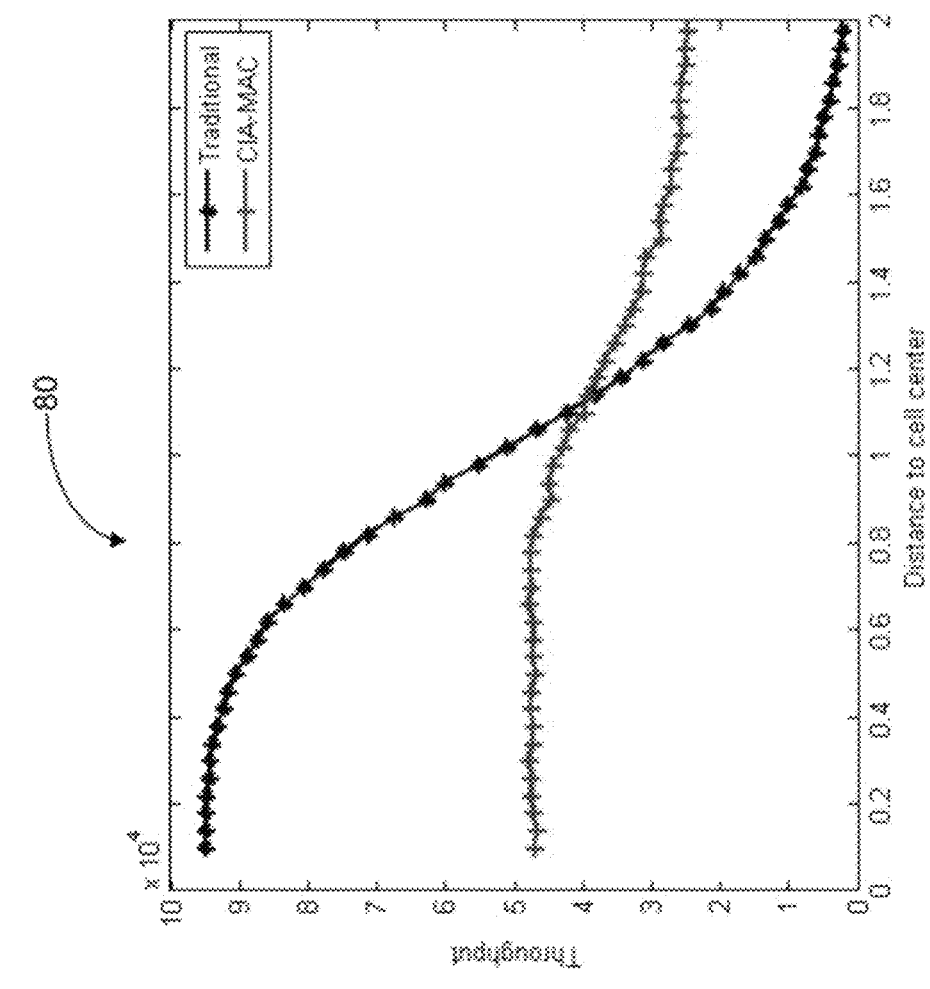
FIG. 7 is a graph of comparing the CIA MAC of FIG. 2 with a legacy MAC, according to some embodiments.
Figure 8:
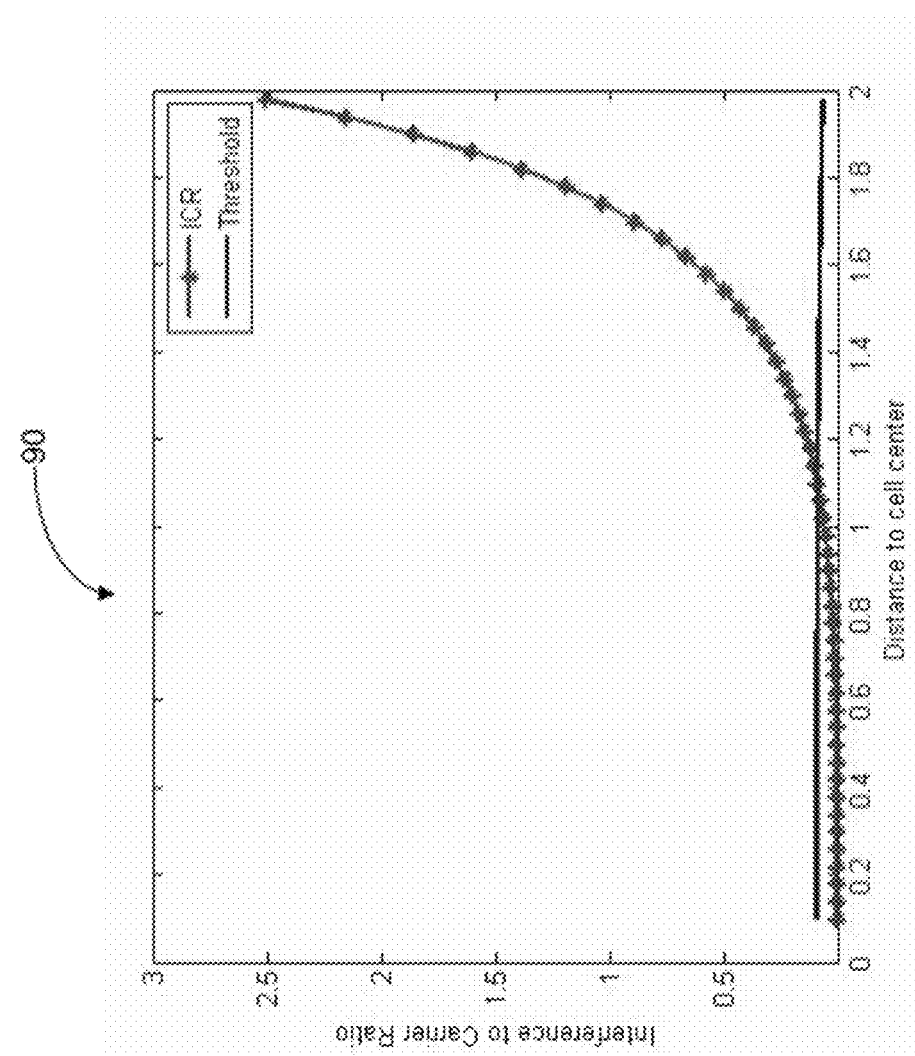
FIG. 8 is a graph showing interference to carrier ratio versus distance, according to some embodiments.
Figure 9:
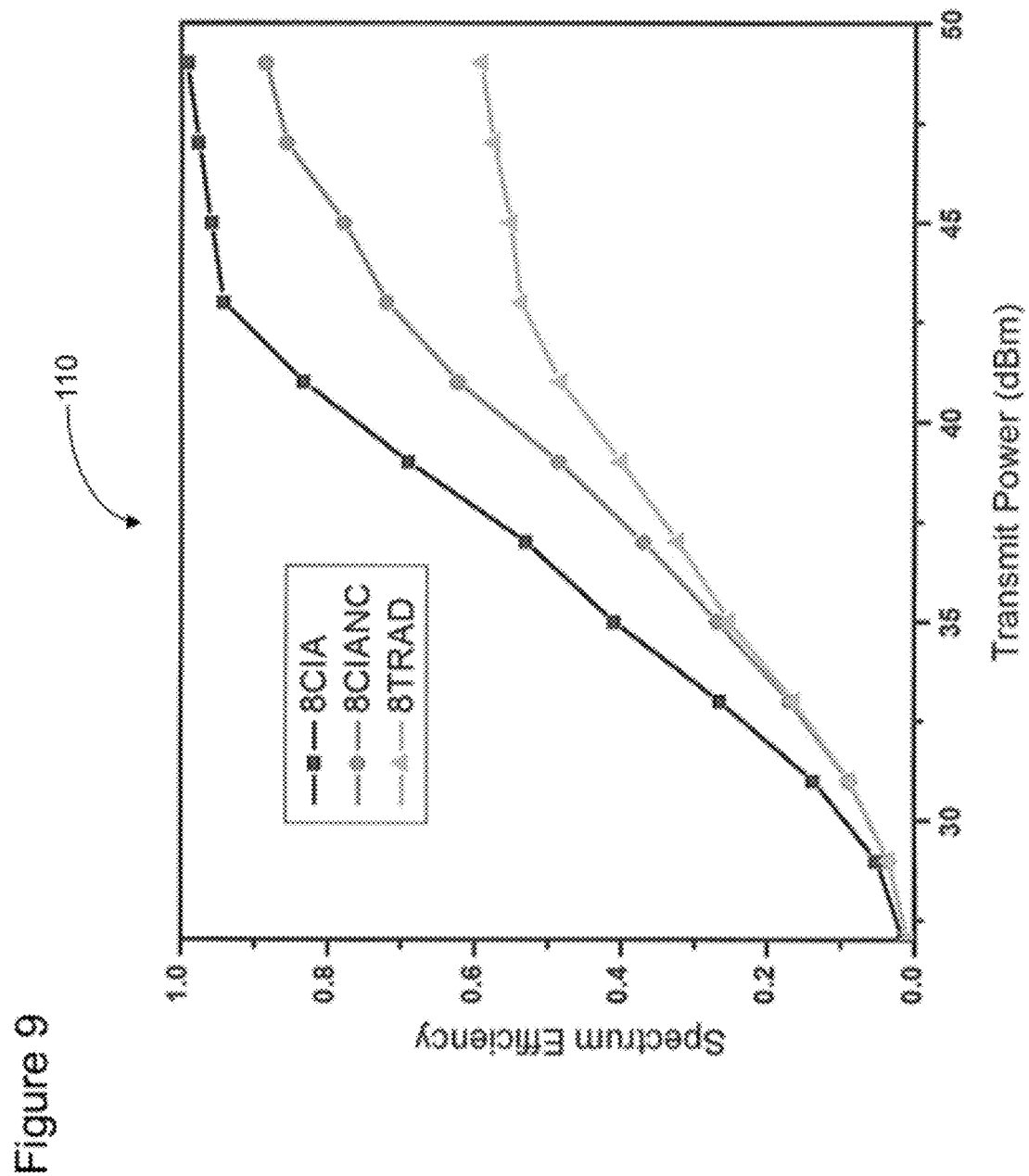
FIG. 9 is a graph showing the spectral efficiency improvement using the CIA MAC of FIG. 2, according to some embodiments.

Observed improvements in throughput and spectral efficiency with the use of the CIA MAC are shown in the following figures. A graph 80 (FIG. 7) is a comparison of the CIA MAC with a traditional MAC for a frequency reuse system. In some embodiments, the use of the CIA MAC is triggered at a distance of 1.2 kilometers (km) from the center of the cell 62, based on the throughput shown at different distances. A graph 90 (FIG. 8) plots distance to call center versus interference to carrier ratio, in some embodiments. Again, the CIA MAC is triggered at a distance of 1.2 km to ensure the best overall throughput at the center cell and at the cell edge. A graph 110 (FIG. 9) plots spectrum efficiency versus transmit power (dBm). The graph 110 shows spectral efficiency improvement with the CIA MAC 10 for 8QAM modulation: 75% for CIA MAC with cross-layer optimization, 34% without cross-layer optimization (reference 43 dBm).

The above results are described for a single-carrier scenario. However, extensions to a multi-carrier OFDM system are achieved, in some embodiments. A simple extension is based on determining the CIA-triggers and thresholds based on the average interference power in the entire OFDM band. Subsequent transmission on each OFDMA sub-channel are controlled by the average "channel threshold" and the instantaneous channel gain on the sub-channel.

In FIG. 2, both the base stations 20 and the subscriber station 30 have CIA MAC functionality. In some embodiments, the interference mitigation system 100 may operate with a legacy subscriber station, i.e., one without CIA MAC functionality. In such a system, the base station 20 may trigger the CIA MAC 40 when the subscriber is located a predetermined distance from the center of the cell 62. For example, if the legacy subscriber is 1.2 km from its cell center, the subscriber is likely to be at the edge of the cell 62, and thus may be more susceptible to interference by other base stations. In this manner, the location of the subscriber station would be the "notification of interference" to the base station, obviating the need for the subscriber station to notify the base station of a likely interference situation.

The interference mitigation system 100 provides a low-complexity method for interference mitigation, which involves limited coordination between base-stations. In some embodiments, the interference mitigation system 100 provides for a relatively decentralized and automatic method for controlling the degree of frequency reuse to improve performance of cell-edge users. Complex frequency reuse and power management schemes across a cellular system are avoided with the interference mitigation system 100.

The interference mitigation system 100 may provide significant benefit to cellular users severely impacted by co-channel interference, thereby improving their quality-of-service. The interference mitigation system 100 may be standardized within next generation cellular standards.

The interference mitigation system 100 is novel in its use of randomization by the base station for controlling the level of interference in the wireless neighborhood. In particular, the interference mitigation system 100 provides fair transmission opportunities for users affected by co-channel interference. Although randomization for collision avoidance is used extensively for uplink random access channels and wireless local area network (LAN) systems, its use by the interference mitigation system 100 for automatically controlling the level of downlink interference per link is novel.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A system, comprising:
a serving base station comprising a co-channel interference avoidance medium access controller (CIA MAC), the CIA MAC comprising transmission randomization capability;
a feedback link between the serving base station and a subscriber station, wherein an interference report is received by the serving base station on the feedback link when an interference-to-carrier ratio exceeds a predetermined threshold; and
an interference reporting link between the serving base station and a second base station, the serving base station and the second base station further comprising physical layer optimization, wherein the base stations determine power allocation and rate parameters for a link between the base station and the subscriber station and the serving base station sends the interference report over the interference link to the second base station;
wherein transmissions to the subscriber station are randomized based on a channel threshold for the subscriber station, and the power allocation is calculated in the CIA MAC of the serving base station, wherein the power allocation calculation is given by:
if $$P_m < \frac{\bar{P}}{1 - F(\bar{H}^*_{(i,j)_k})}, P^*_{(i,j)_k}(h) = P_m \text{ for } h \geq \bar{H}^*_{(i,j)_k},$$

otherwise, $$P^*_{(i,j)_k}(h) = \begin{cases} P_m & v^* < R'\left(\frac{hP_m}{n_oW}\right)\frac{h}{n_oW} \\ 0 & v^* \geq R'\left(\frac{hP_m}{n_oW}\right)\frac{h}{n_oW} \\ R'^{-1}\left(\frac{v^*n_oW}{h}\right)\frac{n_oW}{h} & \text{otherwise,} \end{cases}$$

where $h \geq \bar{H}^*_{(i,j)_k}$, $R'^{-1}(\ )$ is an inverse function of $R'(\ )$, and $v^* \geq 0$ is uniquely given by $$\int_{\bar{H}_{(i,j)_k}}^{\infty} P^*_{(i,j)_k}(h)f(h)dh = \bar{P}.$$

2. The system of claim 1, wherein the transmissions to the subscriber station are randomized after receiving notification from both the serving base station and the second base station.

3. A method, comprising:
receiving, by a serving base station, an indication of interference between a subscriber and a base station in a wireless neighborhood from the subscriber, wherein the subscriber, the base station, and the serving base station occupy a wireless neighborhood comprising a plurality of subscribers and a plurality of base stations; and
randomizing, by the serving base station, transmissions to a link between the subscriber and the base station based on a channel threshold if an interference-to-carrier ratio of the link exceeds a predetermined threshold value
wherein the channel threshold is obtained by executing the CIA MAC operating in the serving base station, wherein the CIA MAC utilizes the following optimization equation to obtain the channel threshold:

$$\bar{H}^* = \underset{\bar{H}}{\operatorname{argmax}} \sum_{\forall (i,j)_k} \ln\left(p(i,j)_k \prod_{l \in N_j}(1-p_l)\right),$$

wherein $(i,j)_k$ is the link between the $i^{th}$ base station and the $j^{th}$ subscriber on the $k^{th}$ channel, and $p(i,j)_k$ is the probability of transmission on link $(i,j)_k$, and $p_l$ is the probability of transmission by the $l^{th}$ interfering base station.

4. The method of claim 3, further comprising:
determining that the subscriber is a predetermined distance from the base station, wherein the subscriber does not have a co-channel interference avoidance medium access controller.

5. The method of claim 4, further comprising:
determining that the subscriber is at least 1.2 kM from the base station.

6. The method of claim 3, further comprising:
receiving, by the serving base station, an indication of interference from the subscriber, wherein the subscriber comprises a co-channel interference avoidance medium access controller.

7. The method of claim 3, further comprising:
transmitting to the subscriber using optimized physical layer parameters if the channel gain of the link does not exceed the channel threshold.

8. The method of claim 7, further comprising:
determining, by the CIA MAC invoked in the base station, power allocation and rate parameters for the link between the base station and the subscriber station.

9. The method of claim 8, determining the power allocation and rate parameters further comprising:
obtaining, by the CIA MAC operating in the serving base station, the power allocation by utilizing the following formula to determine the power allocation:
if $$P_m < \frac{\overline{P}}{1 - F(\overline{H}^*_{(i,j)_k})}, P^*_{(i,j)_k}(h) = P_m \text{ for } h \geq \overline{H}^*_{(i,j)_k},$$

otherwise, $$P^*_{(i,j)_k}(h) = \begin{cases} P_m & \upsilon^* < R'\left(\frac{hP_m}{n_o W}\right)\frac{h}{n_o W} \\ 0 & \upsilon^* \geq R'\left(\frac{hP_m}{n_o W}\right)\frac{h}{n_o W} \\ R'^{-1}\left(\frac{\upsilon^* n_o W}{h}\right)\frac{n_o W}{h} & \text{otherwise,} \end{cases}$$

where $h \geq \overline{H}^*_{(i,j)_k}$, $R'^{-1}()$ is an inverse function of $R'()$, and $\upsilon^* \geq 0$ is uniquely given by $$\int_{\overline{H}_{(i,j)_k}}^{\infty} P^*_{(i,j)_k}(h) f(h) dh = \overline{P}.$$

10. A system, comprising:
a serving base station comprising a co-channel interference avoidance medium access controller (CIA MAC), the CIA MAC comprising transmission randomization capability;
a feedback link between the serving base station and a subscriber station, wherein an interference report is received by the serving base station on the feedback link when an interference-to-carrier ratio exceeds a predetermined threshold; and
an interference reporting link between the serving base station and a second base station, wherein the serving base station sends the interference report over the interference link to the second base station;
wherein transmissions to the subscriber station are randomized based on a channel threshold for the subscriber station;
wherein the channel threshold is calculated in the CIA MAC of the serving base station, and is determined using an optimization equation:

$$\overline{H}^* = \underset{\overline{H}}{\operatorname{argmax}} \sum_{\forall (i,j)_k} \ln\left(p(i,j)_k \prod_{l \in N_j} (1 - p_l)\right),$$

where $(i,j)_k$ is the link between the $i^{th}$ base station and the $j^{th}$ subscriber on the $k^{th}$ channel, and $p(i,j)_k$ is the probability of transmission on link $(i,j)_k$, and $p_l$ is the probability of transmission by the $l^{th}$ interfering base station.

* * * * *

UNITED STATES PATENT AND TRADEMARK OFFICE
CERTIFICATE OF CORRECTION

PATENT NO. : 8,798,653 B2  
APPLICATION NO. : 13/224148  
DATED : August 5, 2014  
INVENTOR(S) : Miao et al.

Page 1 of 1

It is certified that error appears in the above-identified patent and that said Letters Patent is hereby corrected as shown below:

In the Claims

Column 10, line 1, claim 9, delete " $h \geq \overline{H}^*_{(i,j)_k}, R'^{-1}()$ " and insert -- $h \geq \overline{H}^*_{(i,j)_k} \cdot R'^{-1}()$ --, therefor.

Column 10, line 24, claim 10, delete "station;" and insert -- station --, therefor.

Signed and Sealed this  
Twenty-fifth Day of November, 2014

Michelle K. Lee  
*Deputy Director of the United States Patent and Trademark Office*